United States Patent [19]

Emblem et al.

[11] 3,859,198

[45] Jan. 7, 1975

[54] COATING COMPOSITION SUITABLE FOR USE AT HIGH TEMPERATURES

[75] Inventors: Harold Garton Emblem, Bromley; James Howarth-Williams, Pudey, both of England

[73] Assignee: Zirconal Processes Limited, Bromley, England

[22] Filed: Feb. 14, 1973

[21] Appl. No.: 332,507

[30] Foreign Application Priority Data
Feb. 15, 1972  Great Britain...................... 6991/72

[52] U.S. Cl.............. 204/290 R, 106/286, 117/228, 204/294
[51] Int. Cl........................... B01k 3/04, B44d 1/20
[58] Field of Search.......... 106/286; 204/294, 290 R

[56] References Cited
FOREIGN PATENTS OR APPLICATIONS 1,182,241   2/1970   Great Britain
1,271,007   6/1948   Germany
993,244    10/1951   France

OTHER PUBLICATIONS

Chem. Abst. 53: 5926d, 1959.

Chem. Abst. 55: 14,986e, 1961.

Chem. Abst. 62: 15877f, 1965.

Chem. Abst. 65: 3416e, 1965.

Primary Examiner—Theodore Morris
Attorney, Agent, or Firm—Christensen, O'Connor, Garrison & Havelka

[57] ABSTRACT

The invention provides a coating composition for protecting the carbon anode in electrolytic aluminium production. The composition consists of an aluminium oxide and an aluminium and oxygen-based binder.

13 Claims, No Drawings

COATING COMPOSITION SUITABLE FOR USE AT HIGH TEMPERATURES

This invention relates to a coating composition suitable for use at high temperatures. More specifically, the invention relates to a composition for the protection of carbon anodes used in the production of aluminium by electrolytic processes.

One method for the production of aluminium by an electrolytic process comprises the electrolysis of a solution of aluminium oxide in molten cryolite, using a cathode comprising a mild steel bar which is lined with carbon and an anode comprising a block of carbon. Aluminium is obtained at the cathode and oxygen is obtained at the anode. The electrolysis is carried out at about 700 C, consequently the carbon anode is consumed quite rapidly by oxidation. Any reduction in the rate of consumption of the carbon anode is highly desirable, as this will extend the operating life of the electrolysis cell and will also make the electrical characteristics of the cell more consistent. A typical carbon anode will comprise petroleum coke, with pitch as binder. The petroleum coke will also contain a proportion of the carbon material recovered from spent carbon electrodes. The process is more fully described in "The Invergordon Smelter" British Aluminium Co. Ltd., Invergordon Fourth Edition January, 1972. Reference is also made to the Kirk-Othmer Encyclopedia of Chemical Technology 2nd Edition, Volume 1 Pages 941–944.

According to the present invention there is provided a composition for the protection of carbon anodes used in the electrolytic production of aluminium, such composition comprising an oxide of aluminium and a binding solution of an aluminium and oxygen-containing substance which is capable of producing, with the aluminium oxide, an aluminium based protective coating on the anodes during electrolysis.

The said substance may be one or a combination of the following: aluminium hydroxychlorides, chlorohydrates and complexes thereof; aluminium phosphates and polyphosphates; aluminium acetates; aluminium alkoxides; alkali metal aluminates or solutions prepared by dissolving precipitated hydrated aluminium oxides in aqueous sodium hydroxide solution. The use of phosphates and polyphosphates may give rise to an undesirable contamination by phosphorus of the aluminium in the electrolysis cell. The complexes of aluminium chlorohydrate envisaged are the lactate complexes described in British Patent Specification No. 845,670 and the reaction products of aluminium chlorohydrates and soluble alkali described in U.S. Pat. No. 2,876,163. The presence of chlorine is undesirable in the coating composition because of reaction with the cryolite solvent in the cell. In the complexes envisaged the chlorine content is reduced thereby rendering the use of chlorohydrates acceptable.

The oxide of aluminium may be a fused alumina or a calcined alumina or a precipitated aluminium hydroxide. Examples of suitable aluminium oxides which may be hydrated include tabular alumina, the so-called "Bayer aluminas," bauxite ores, the hydrated aluminium oxides such as Gibbsite ($Al_2O_3$, $3H_2O$) and Boehmite ($A7_2O_3$, $H_2O$) together with the calcined forms prepared therefrom, crystalline aluminas such as alpha alumina. Other suitable aluminium oxides include the alkalised aluminas whose preparation is described in British Pat. No. 1,234,931, also the low soda aluminium oxide and hydrated aluminium oxide sold under the British Registered Trade Mark "Cera." Also suitable are the crude aluminium oxide residues resulting from the processing of bauxite ores. However, these are not preferred, because the aluminium oxide content is relatively low and the iron oxide content is high.

For binders other than aluminium alkoxides a convenient solvent is water. A convenient aluminium alkoxide is aluminium isopropoxide, a suitable solvent being benzene or isopropanol. The inorganic binders and the aluminium acetates are commercially available. Cawood 5025 is an example of a commercially available inorganic aluminium binding liquid and is essentially an aluminium chlorohydrate solution.

Preferably the particle size of the aluminium oxide should not be above 60 mesh British Standard Sieve, as it is desired that the aluminium oxide should remain in suspension. A large proportion of the aluminium oxide should have a particle size under 75 microns.

The composition may be prepared by dispersing the aluminium oxide in the binding medium. This can conveniently be done by means of a high speed stirrer, by a ball mill, or by means of a triple roll mill.

According to another important aspect of the invention, a method for the protection of carbon anodes used in the production of aluminium by an electrolytic process comprises applying to the electrode one or a combination of the compositions set forth above.

The present invention also provides a carbon anode protected by a composition as described above.

The composition is conveniently applied to the electrode as a thin film. It may be applied by painting, dipping or by spraying. The coating may be allowed to dry at ambient temperature or by the application of heat.

Embodiments of the invention will be described in the following examples.

EXAMPLE I

For coating compositions were prepared by adding to 50 g. Cawood 5025 (an aluminium chlorohydrate) solution each of the following aluminium oxides and dispersing the aluminium oxide with a high speed stirrer:
a. 100 g. Bayer alumina residues
b. 100 g. fused alumina, all passing 300 mesh B.S. 410 sieve.
c. 66 g. calcined alumina all passing 100 mesh B.S. 410 sieve.

The aluminium oxide tended to settle but could easily be re-dispersed on stirring. Each composition was applied to a graphite electrode by dipping, then the coated electrode was baked at 90°C until the coating was hard. All three compositions gave hard adherent coatings. Better results were obtained by applying the composition to the warm electrode.

Example II

Satisfactory coating compositions are obtained by dispersing bauxite or Bayer alumina or Bayer alumina residues in an aqueous solution of sodium aluminate or a solution prepared by dissolving precipitated hydrated aluminium oxide in aqueous sodium hydroxide solution.

EXAMPLE III

A coating composition was prepared by mixing the following:

| | | |
|---|---|---|
| RASC bauxite | 60 mesh (B.S.410 sieve) | 20 parts by weight |
| Calcined alumina (Alcoa A-2 grade | 325 mesh (Tyler sieve) | 10 parts by weight |
| Aluminium chlorhydrate solution | | 10 parts by weight |

To the mixed solids is added the aluminium chlorhydrate solution. A paint-like consistency was achieved on stirring. This gave a satisfactory coating on a carbon anode which dried free of tack in about 3 hours giving a rather soft coating which hardened on standing for 24 hours. A better consistency was obtained using 8 parts by weight of the aluminium chlorhydrate solution.

RASC bauxite is a calcined bauxite. The preparation and properties of this material are described by J. G. Lindsay, Refractories Jnl., 1971. 46, (1) 6. The material is prepared by calcining a Guyana bauxite ore.

The aluminium chlorhydrate solution used is described in Laporte Industries Ltd., Technical Publication GC5.

EXAMPLE IV

A coating composition was prepared by mixing the following:

| | | |
|---|---|---|
| RASC bauxite | 60 mesh (B.S. 410 Sieve) | 60 parts by weight |
| Calcined alumina (Alcoa A-2 grade | 325 mesh (Tyler Sieve) | 30 parts by weight |

To the mixed solids is added with stirring, 10 parts by weight of aluminium isopropoxide dissolved in 30 parts by weight of benzene. A further 5 parts by weight of benzene were required to give a workable consistency. The composition was painted onto a carbon anode to provide a protective coating. The coating was however brittle and not entirely satisfactory due to benzene solvent attacking the pitch used to bind the anode.

EXAMPLE V

A coating composition was prepared by mixing the following:

| | | |
|---|---|---|
| RASC bauxite —60 mesh (B.S. 410 sieve) | | 20 parts by weight |
| MA65 micronised alumina | | 5 parts by weight |
| Basic aluminium acetate [CH₃ COO)₄OAl₂ 4H₂O] | | 5 parts by weight |

MA65 micronised alumina is a micronised calcined alumina, described in Baco Chemicals data sheet 902. MA65 micronised alumina has a specific surface (CM/g) of 6500 ± 1500 and a crystallite mean size of 6.9 microns. It is essentially alpha alumina.

To the mixture was added 10 parts by weight of water to give a mix of paint-like consistency on stirring. This painted satisfactorily on a carbon anode dried in an hour giving a rather soft coating, which became somewhat brittle on standing for 24 hours.

EXAMPLE VI

A coating composition was prepared by mixing the following:

| | | |
|---|---|---|
| RASC bauxite | 60 mesh (B.S.410 sieve) | 50 parts by weight |
| MA65 alumina | | 10 parts by weight |
| Aluminium orthophosphate (AlPO₄ + H₂O) | | 10 parts by weight |

20 parts by weight of water were added to give a mix of paint-like consistency on stirring. This painted satisfactorily onto a carbon anode, drying in about 20 minutes giving a soft coating. On standing for 24 hours the adhesion of the coating to the carbon anode was satisfactory.

EXAMPLE VII

A coating composition was prepared by mixing the following:

| | |
|---|---|
| Sodium aluminate | 11 parts by weight |
| Micronised alumina MA65 | 36 parts by weight |
| RASC bauxite — 60 mesh (B.S. 410 sieve) (or BX 60 calcined bauxite supplied by P.B. Sillimanite Co. Ltd.) | 63 parts by weight |

To prepare the coating composition, 132 parts by weight of the above mixture of solids are mixed with 48 parts by weight of water. Heat is evolved during the mixing and the composition should not be used before it has cooled to ambient temperature. This composition gave the best coverage of a carbon anode when the anode was heated to between 60°–90°C. This is for application by brushing. The best method of applying a coat by dipping is by dipping the electrode (temperature 60°–90°C.) into the composition for about 5 seconds, drying for 5–10 seconds, then dipping again for about 5 seconds. This example provides the preferred composition.

EXAMPLE VIII

British Aluminium Co. Ltd. have developed an alumina hydrate solid which will disperse on stirring in water to give an alumina sol. The solid has the Boehmite structure. It contains about 70 % $Al_2O_3$ and can be dispersed easily in water to give an alumina sol containing ca 20 % $Al_2O_3$. The sol particle size is large, of the order of 500 A. The alumina hydrate solid is termed "Cera sol" alumina hydrate.

50 parts of Cera sol alumina hydrate were added with stirring to 150 parts of deionised water. This gave an alumina sol. The addition, with stirring, of 500 parts of RASC bauxite (passing 60 mesh B.S. 410 sieve) gave a composition of paint-like consistency. This coated a carbon anode satisfactorily by dipping. The coating was tack-free in 30 minutes, giving a rather soft coating. After 1 hour, the coating was quite hard.

The composition gelled after standing for about 2 hours. Parts are by weight.

The preferred composition for coating carbon anodes is the composition of example VII. For carbon anodes comprising petroleum coke with pitch as binder, the preferred water/powder proportion is not more than 48 lb. water to 132 lb. solids. These anodes will usually weigh about 0.5 ton and there will be an area of about 2 sq. yd. to be coated. For such an anode the weight of powder per anode should be about 3.5 lb. and perferably 4.0 lb.

Table I gives the results obtained in a comparison of coated and uncoated carbon anodes. All the anodes were used in the electrolysis cells for the same time. After removal from the cell, the weight of anode material recovered was determined.

TABLE I

Comparison of coated and uncoated carbon anodes

| Current in coated anode (kA) | Weight of anode material recovered (Kg) | | Weight difference (Kg) | Percentage | Wgt. of Coating (lb) |
| --- | --- | --- | --- | --- | --- |
| | coated anode | uncoated anode control | | | |
| 7.24 | 155.5 | 124.1 | 31.4 | 25 | 4.06 |
| 7.25 | 155.9 | 124.1 | 31.8 | 25 | 3.48 |
| 7.25 | 155.9 | 119.9 | 36.0 | 30 | 3.48 |

The results show clearly that the coated anodes give a greater weight of recovered material, due to protection of the anodes by the coating. As recovered material is added to the petroleum coke used to make the carbon anodes, it will be appreciated that an increase in the weight of material recovered is highly desirable.

The compositions of the present invention can also be used, in accordance with the invention, to protect the carbon coating on the cathode in the electrolytic production of aluminium.

What is claimed is:

1. A method of forming on a carbon electrode a coating that is convertible to an aluminum based protective coating upon use of said electrode as an anode in the production of aluminum metal by electrolysis, comprising (1) applying to said carbon electrode a composition comprising finely divided particles of an oxide of aluminum dispersed in a binding solution therefor, said binding solution comprising at least one substance selected from the group consisting of aluminum hydroxychlorides, chlorohydrates and complexes thereof; aluminum phosphates and polyphosphates; aluminum acetates; aluminum alkoxides; and alkali metal aluminates and solutions prepared by dissolving precipitated hydrated aluminum oxides in an aqueous sodium hydroxide solution; and (2) drying the resulting coating.

2. The method of claim 1 wherein said substance is sodium aluminate.

3. The method of claim 1 wherein said oxide of aluminum is a fused alumina, a calcined alumina or a precipitated aluminum hydroxide.

4. The method of claim 3 wherein said substance is sodium aluminate.

5. The method of claim 4 wherein the particle size of said oxide of aluminum does not exceed 75 microns.

6. The method of claim 1 wherein the particle size of said oxide of aluminum does not exceed 75 microns.

7. The method of claim 1 wherein said carbon electrode is comprised of petroleum coke and pitch.

8. An electrode useful an an anode in the production of aluminum metal by electrolysis produced by (1) coating a carbon electrode with a composition comprised of finely divided particles of an oxide of aluminum dispersed in a binding solution containing at least one substance selected from the group consisting of aluminum hydroxychlorides, chlorohydrates and complexes thereof; aluminum phosphates and polyphosphates; aluminum acetates; aluminum alkoxides; and alkali metal aluminates and solutions prepared by dissolving precipitated hydrated aluminum oxides in an aqueous sodium hydroxide solution; and (2) drying the resulting coating; said coating being convertible to an aluminum based coating during such electrolysis.

9. The electrode of claim 8 wherein said substance is sodium aluminate.

10. The electrode of claim 8 wherein said oxide of aluminum is a fused alumina, a calcined alumina or a precipitated aluminum hydroxide.

11. The electrode of claim 10 wherein said substance is sodium aluminate.

12. The electrode of claim 11 wherein the particle size of said oxide of aluminum does not exceed 75 microns.

13. The electrode of claim 8 wherein the particle size of said oxide of aluminum does not exceed 75 microns.

* * * * *